United States Patent
Nakade

(10) Patent No.: US 6,852,938 B2
(45) Date of Patent: Feb. 8, 2005

(54) MULTIDIRECTIONAL OPERATION SWITCH

(75) Inventor: Yoshiyuki Nakade, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/701,604

(22) Filed: Nov. 6, 2003

(65) Prior Publication Data

US 2004/0129552 A1 Jul. 8, 2004

(30) Foreign Application Priority Data

Nov. 19, 2002 (JP) ........................................ 2002-334825

(51) Int. Cl.⁷ .............................................. H01H 29/16
(52) U.S. Cl. ...................................... 200/200; 200/18
(58) Field of Search ............................ 200/4, 18, 5 R, 200/5 A, 17 R, 517, 553, 339

(56) References Cited

U.S. PATENT DOCUMENTS

| 2,808,482 | A | * | 10/1957 | Zanichkowsky et al. | .... 200/457 |
| 4,519,268 | A | * | 5/1985 | Oda | ........................ 74/473.34 |
| 4,904,833 | A | * | 2/1990 | Sato et al. | .................. 200/557 |
| 4,978,823 | A | * | 12/1990 | Sato et al. | .................. 200/437 |
| 5,151,563 | A | * | 9/1992 | Tanaka | ....................... 200/6 A |
| 5,336,861 | A | * | 8/1994 | Cummins et al. | ........... 200/339 |
| 5,607,049 | A | * | 3/1997 | Shioda | ...................... 200/557 |
| 6,080,942 | A | * | 6/2000 | Sasaki | ...................... 200/17 R |
| 6,339,201 | B1 | * | 1/2002 | Balaban et al. | ............. 200/339 |
| 6,459,060 | B1 | * | 10/2002 | Bartok | ........................ 200/553 |
| 6,570,114 | B1 | * | 5/2003 | Czarnecki | ................... 200/553 |
| 6,580,039 | B2 | * | 6/2003 | Nakade et al. | ............... 200/6 A |
| 6,600,122 | B1 | * | 7/2003 | Czarnecki et al. | .......... 200/553 |
| 6,720,504 | B2 | * | 4/2004 | Nishimoto et al. | ............ 200/4 |

FOREIGN PATENT DOCUMENTS

JP 2001-266712 9/2001

* cited by examiner

Primary Examiner—Elvin Enad
Assistant Examiner—Lisa Klaus
(74) Attorney, Agent, or Firm—Wenderoth, Lind & Ponack, L.L.P.

(57) ABSTRACT

In a multidirectional operation switch, a lower case covers the bottom of a substantially cylindrical upper case. A rocking body is held between the upper case and the lower case to be capable of rocking. The rocking body has a plurality of depressing parts radially projecting from the center thereof, and an operating shaft projecting upwardly therefrom. A plurality of switches are depressed by the plurality of corresponding depressing parts according to rocking of the rocking body to establish or break electrical contact. A resilient member and a tactile feedback member are housed in the lower portion of the rocking body. The tactile feedback member is urged by the resilient member and brought into contact with a recess provided in the lower case.

4 Claims, 5 Drawing Sheets

MULTIDIRECTIONAL OPERATION SWITCH

FIELD OF THE INVENTION

The present invention relates to a multidirectional operation switch for use mainly in air conditioning control equipment for an automobile.

BACKGROUND OF THE INVENTION

Recent automobiles have more advanced and various functions. Accordingly, in order to improve the operability of a control unit thereof, a so-called multidirectional operation switch capable of performing a plurality of operations with one switch unit is used instead of a plurality of push button switches on a control panel in many cases.

For example, one of such multidirectional operation switches is disclosed in the Japanese Patent Unexamined Publication No. 2001-26671.

An example of such conventional multidirectional operation switches is described with reference to FIG. 5. FIG. 5 is a sectional side elevation of a conventional multidirectional operation switch.

With reference to FIG. 5, upper case 1 is formed of an insulating resin into a cylindrical shape. Upper case 1 has through-hole 1A and cylindrical guide portion 1C in substantially a center thereof. Through-hole 1A has upper support 1B that forms an angular edge at the bottom end of the inner circumference thereof.

Lower case 2 is formed of an insulating resin into substantially a plate shape. Lower case 2 covers the bottom of upper case 1. Lower case 2 further has a protrusion that protrudes like a hill on the bottom surface in substantially the center thereof. Along the outer periphery of the top surface of this protrusion, lower support 2B is provided.

Circuit board 3 has a plurality of conductive patterns (not shown) formed on top and bottom surfaces thereof. On the top surface of circuit board 3, four push button switches 4A, 4B, 4C and 4D are radially disposed in four positions on a circle having a center at the center of central circular hole 3A. Respective push switches 4A, 4B, 4C, and 4D work as switch contacts in which depressing operations establish or break electrical contact with tactile feedback.

Lower support 2B of lower case 2 penetrates through circular hole 3A in circuit board 3 and protrudes upwardly. Circuit board 3 is fixed to lower case 2 by screws 102 through bosses 2D. Further, leads (not shown) connected to one end of circuit board 3 are led out of the multidirectional switch and electrically connected to electronic circuits (not shown) of an automobile.

Rocking body 6 is formed of an insulating resin into a shape substantially like a cylindrical shaft, and is disposed above circuit board 3. Rocking body 6 has spherical contact portion 6A disposed upwardly in the vicinity of the bottom end of the rocking body, and bearer portion 6B protruding downwardly. Contact portion 6A is supported by upper support 1B of upper case 1 to be capable of rocking. Similarly, bearer portion 6B is supported by lower support 2B of lower case 2 to be capable of rocking. Further, a plurality of depressing parts 6C, 6D, 6E, and 6F radially project from the bottom end of contact portion 6A to correspond with push button switches 4A, 4B, 4C, and 4D disposed on circuit board 3, respectively. The bottom surfaces of the tips of depressing parts 6C through 6F are in contact with corresponding push button switches 4A through 4D.

Operating shaft 6G extends from the top end of contact portion 6A, penetrating through through-hole 1A of upper case 1, and projects upwardly. Between the bottom end of lower support 2B of lower case 2 and the root of depressing parts 6C through 6F of rocking body 6, coil spring 7 made of a metal wire is disposed in a slightly elongated manner to urge rocking body 6 upwardly.

Additionally, operating body 8 has operating parts 8A through 8D on the upper surface thereof that are disposed to correspond with depressing parts 6C through 6F of rocking body 6, respectively. The top end of operating shaft 6G is fixed to the bottom surface of bowl-shaped operating body 8 by machine screw 104 or the like.

The multidirectional operation switch is structured as above. In the above structure, operating body 8 is depressed in a given direction. When operating part 8A at the right end, for example, is depressed downwardly, contact portion 6A of rocking body 6 urged upwardly by coil spring 7 rocks in a rightward direction together with operating body 8, while the contact portion is in contact with upper support 1B. At this time, depressing part 6C depresses push button switch 4A. This establishes or breaks electrical contact of push button switch 4A with tactile feedback. The electrical contact signal of push button switch 4A is transferred to the electronic circuits of an automobile outside of the multidirectional switch via leads on circuit board 3.

Similarly, when operating part 8B at the left end of operating body 8 is depressed downwardly, depressing part 6D on the left side depresses push button switch 4B. This establishes or breaks electrical contact of push button switch 4B with tactile feedback. Further, when operating part 8C or 8D in the forward or backward direction is depressed downwardly, depressing part 6E or 6F depresses push button switch 4C or 4D, respectively. This establishes or breaks electrical contact of each switch.

At this time, rocking body 6 is urged upwardly by coil spring 7. Then, contact portion 6A of rocking body 6 is brought into contact with upper support 1B along a line or at a point. Because there is a gap between bearer portion 6B and lower support 2B, rocking body 6 rocks in a direction of depression with jerky movement when one of operating parts 8A through 8D of operating body 8 is depressed downwardly against the urging force of coil spring 7.

Additionally, push button switches 4A through 4D perform contact operations with tactile feedback when operating body 8 is depressed. At this time, because rocking body 6 is urged upwardly by coil spring 7 at the root of depressing parts 6C through 6F, the tactile feedback obtained through operating body 8 is poor.

As described above, the conventional multidirectional operation switch tends to cause jerky movement and provide poor tactile feedback during operation. For these reasons, when a user operates the switch, while driving an automobile, it may be difficult for the user to operate the switch properly and recognize whether the user has performed a given operation positively. In other words, in some cases, a user cannot obtain a positive feel of operation.

SUMMARY OF THE INVENTION

The present invention aims to provide a multidirectional operation switch of a simple structure that causes less jerky movement and provides a positive feel of operation during operation and has excellent operability.

The multidirectional operation switch of the present invention includes:

(a) a substantially cylindrical upper case;

(b) a lower case covering the bottom surface of the upper case;

(c) a rocking body held between the upper case and the lower case to be capable of rocking, the rocking body having a plurality of depressing parts projecting radially from the center thereof, and an operating shaft projecting upwardly therefrom;

(d) a plurality of switches to be depressed by the plurality of corresponding depressing parts according to rocking of the rocking body to establish or break electrical contact;

(e) a resilient member housed in a lower portion of the rocking body; and (f) a tactile feedback member housed in a position below the resilient member in the lower portion of the rocking body.

Further, the tactile feedback member is urged by the resilient member and brought into resilient contact with a recess provided in the lower case.

In this multidirectional operation switch, (i) the rocking body has a spherical fulcrum portion, that is the center of rocking, in the middle thereof leading to the operating shaft;

(ii) the upper case has an upper support having a spherical curved surface;

(iii) the lower case has a lower support having a spherical curved surface;

(iv) the fulcrum portion is held by the spherical curved surface of the upper support and the spherical curved surface of the lower support; and (v) the centers of the spherical fulcrum portion, the spherical curved surface of the upper support, and the spherical curved surface of the lower support are in substantially the same position.

DETAILED DESCRIPTION OF THE INVENTION

Figure 1:
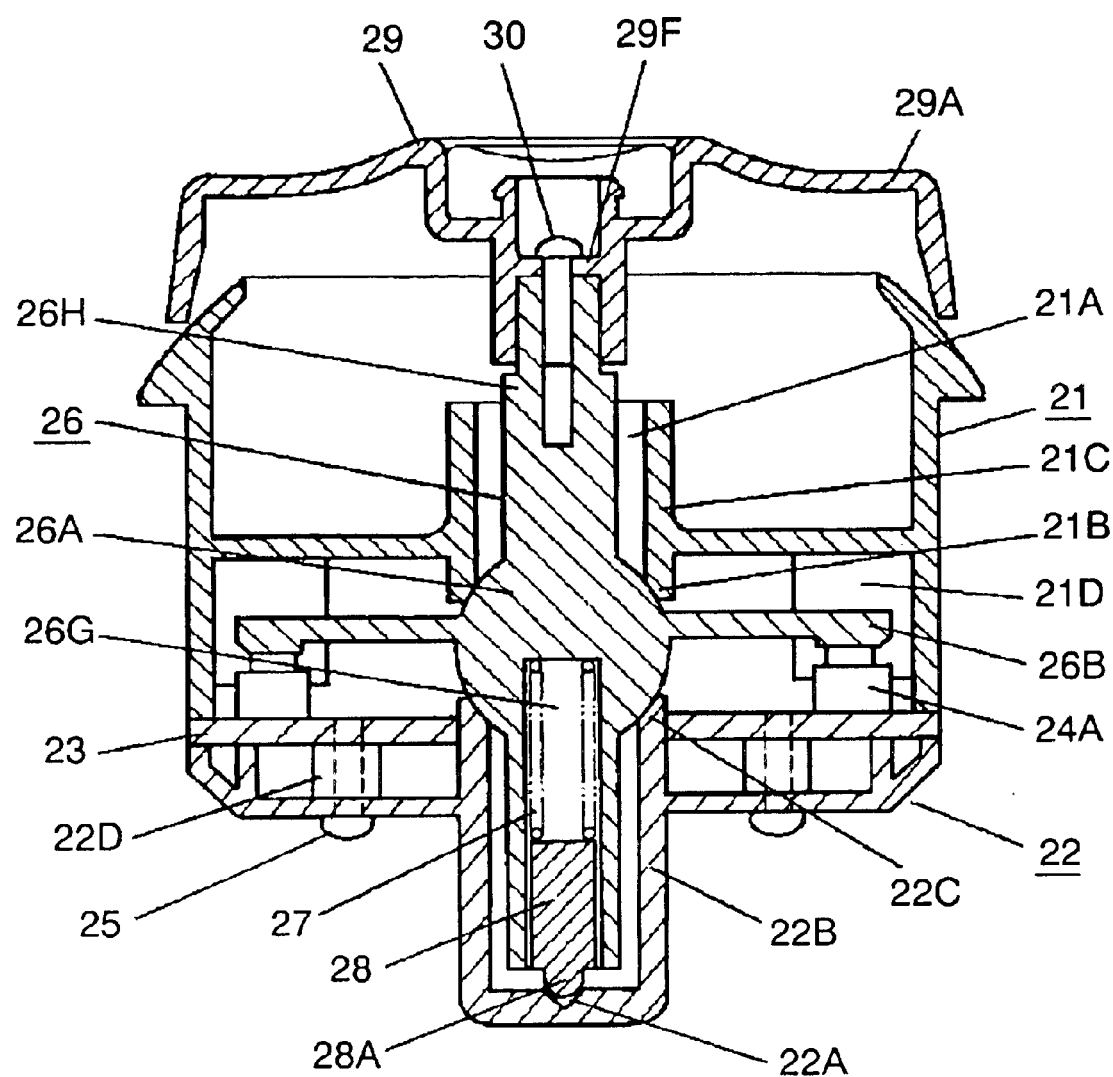
FIG. 1 is a sectional side elevation of a multidirectional operation switch in accordance with an exemplary embodiment of the present invention.
Figure 2:
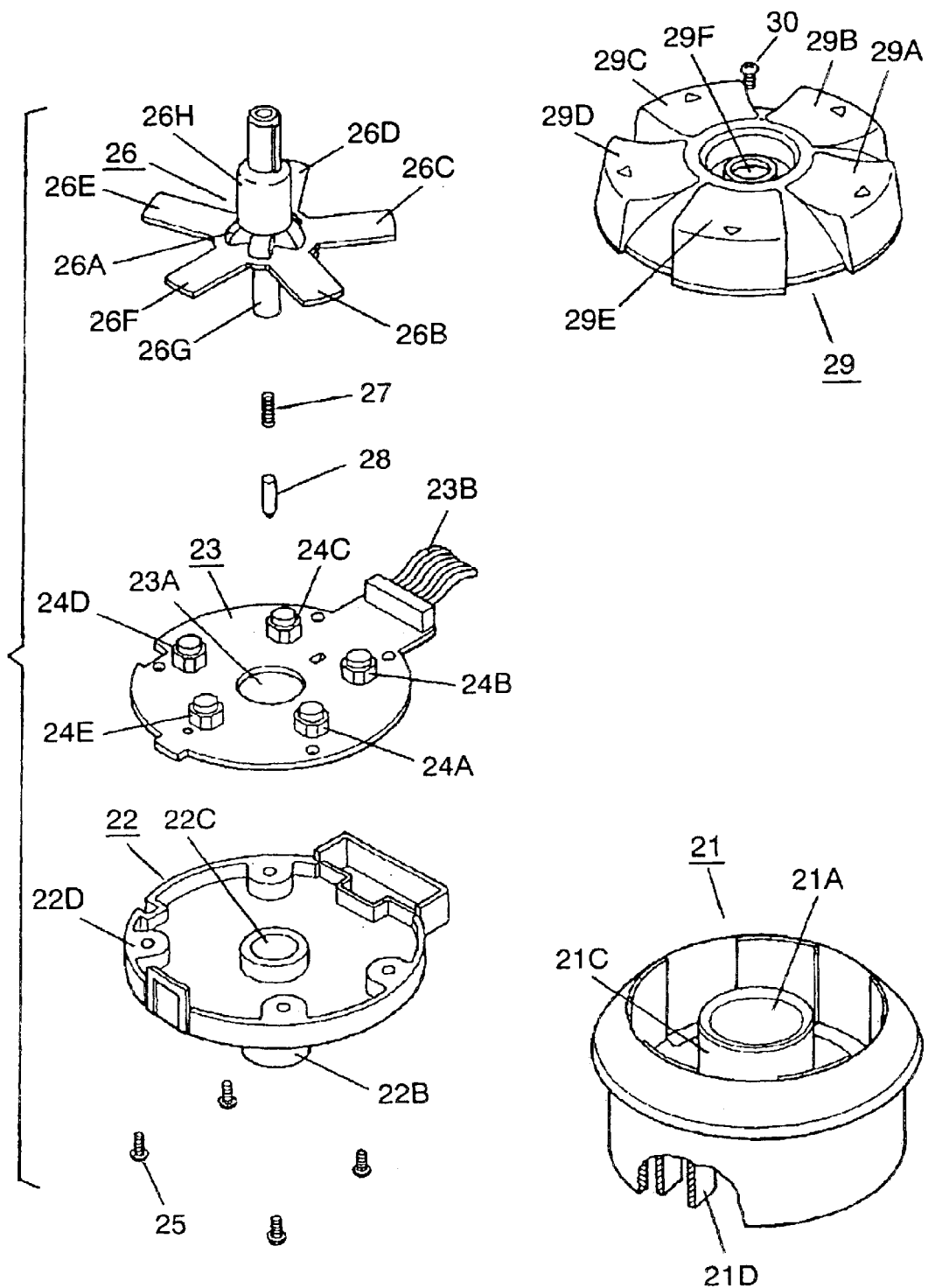
FIG. 2 is an exploded perspective view of the multidirectional operation switch in accordance with the exemplary embodiment of the present invention.

An exemplary embodiment of the present invention is described hereinafter with reference to FIGS. 1 through 4.
Exemplary Embodiment FIG. 1 is a sectional side elevation of a multidirectional operation switch in accordance with the exemplary embodiment of the present invention. FIG. 2 is an exploded perspective view of the switch.

With reference to FIGS. 1 and 2, upper case 21 is formed of an insulating resin into substantially a cylindrical shape having openings at the top and bottom thereof. Upper case 21 has through-hole 21A and cylindrical guide portion 21C in substantially the center thereof. Through-hole 21A has upper support 21B on the bottom surface of the inner circumference thereof. Upper case 21 further has a plurality of wall-shaped restricting parts 21D along the inner circumference in the vicinity of the bottom surface thereof at predetermined intervals.

Lower case 22 is formed of an insulating resin into substantially a plate shape. Lower case 22 covers the bottom of upper case 21. Lower case 22 further has pit portion 22B on the bottom in substantially the center thereof. Pit portion 22B has substantially conical recess 22A. On the upper end face of pit portion 22B, lower support 22C is provided.

As shown in the sectional views of essential parts in FIG. 4, the side face of recess 22A is formed of first inclined plane 22E leading to the center of recess 22A, and second inclined plane 22F leading to the first inclined plane. The inclination of first inclined plane 22E is larger than that of second inclined plane 22F.

Circuit board 23 has a plurality of conductive patterns (not shown) formed on top and bottom surfaces thereof. On the top surface of circuit board 23, five push button switches 24A, 24B, 24C, 24D and 24E are radially disposed in equiangular positions on a circle having a center at the center of central circular hole 23A. Respective push button switches 24A, 24B, 24C, 24D and 24E work as switch contacts in which depressing operations establish or break electrical contact. Lower support 22C of lower case 22 penetrates through circular hole 23A in circuit board 23 and projects upwardly. Circuit board 23 is fixed to lower case 22 by screws 25 through bosses 22D. Further, leads 23B connected to one end of circuit board 23 are led out of the multidirectional switch and electrically connected to electronic circuits (not shown) of an automobile.

Rocking body 26 is formed of an insulating resin and disposed above circuit board 23. Rocking body 26 has spherical fulcrum portion 26A in the center thereof. Fulcrum portion 26A is supported by upper support 21B of upper case 21 and lower support 22C of lower case 22 to be capable of rocking. Five depressing parts 26B, 26C, 26D, 26E, and 26F radially project from the outer circumference of this fulcrum portion 26A to correspond with push button switches 24A, 24B, 24C, 24D and 24E disposed on circuit board 23, respectively. Depressing parts 26B through 26F are in contact with corresponding push button switches 24A through 24E while lateral rotation of the depressing parts is restricted by restricting part 21D of upper case 21.

Upper support 21B and lower support 22C form recessed spherical surfaces. The centers of these curved surfaces are in a position that is the same as the center of spherical fulcrum portion 26A of rocking body 26. The radius of the spherical surfaces of upper support 21 and lower support 22C is slightly larger than the radius of spherical fulcrum portion 26A.

In the lower part of fulcrum portion 26A, housing 26G projecting downwardly and having a hollow part is provided. Further, on the top surface of fulcrum portion 26A, substantially cylindrical operating shaft 26H is provided. The operating shaft projects upwardly, penetrating through through-hole 21A of upper case 21. Housing 26G houses coil spring 27 and tactile feedback pin 28. Coil spring 27 is made of a metal wire and slightly elongated, and serves as a resilient member. Tactile feedback pin 28 is made of a metal or insulating resin, and serves as a tactile feedback member. Semi-spherical tip part 28A of tactile feedback pin 28 is in resilient contact with recess 22A in lower case 22.

Bowl-shaped operating body 29 has five operating parts 29A, 29B, 29C, 29D and 29E on the top surface thereof.

Operating parts 29A, 29B, 29C, 29D, and 29E are disposed above depressing parts 26B, 26C, 26D, 26E, and 26F of rocking body 26, respectively. Operating body 29 is disposed to cover the opening on the top surface of upper case 21. Mounting part 29F at the center of the operating body is fixed to the tip of operating shaft 26H by screw 30.

The multidirectional operation switch is structured as above.

Figure 3:
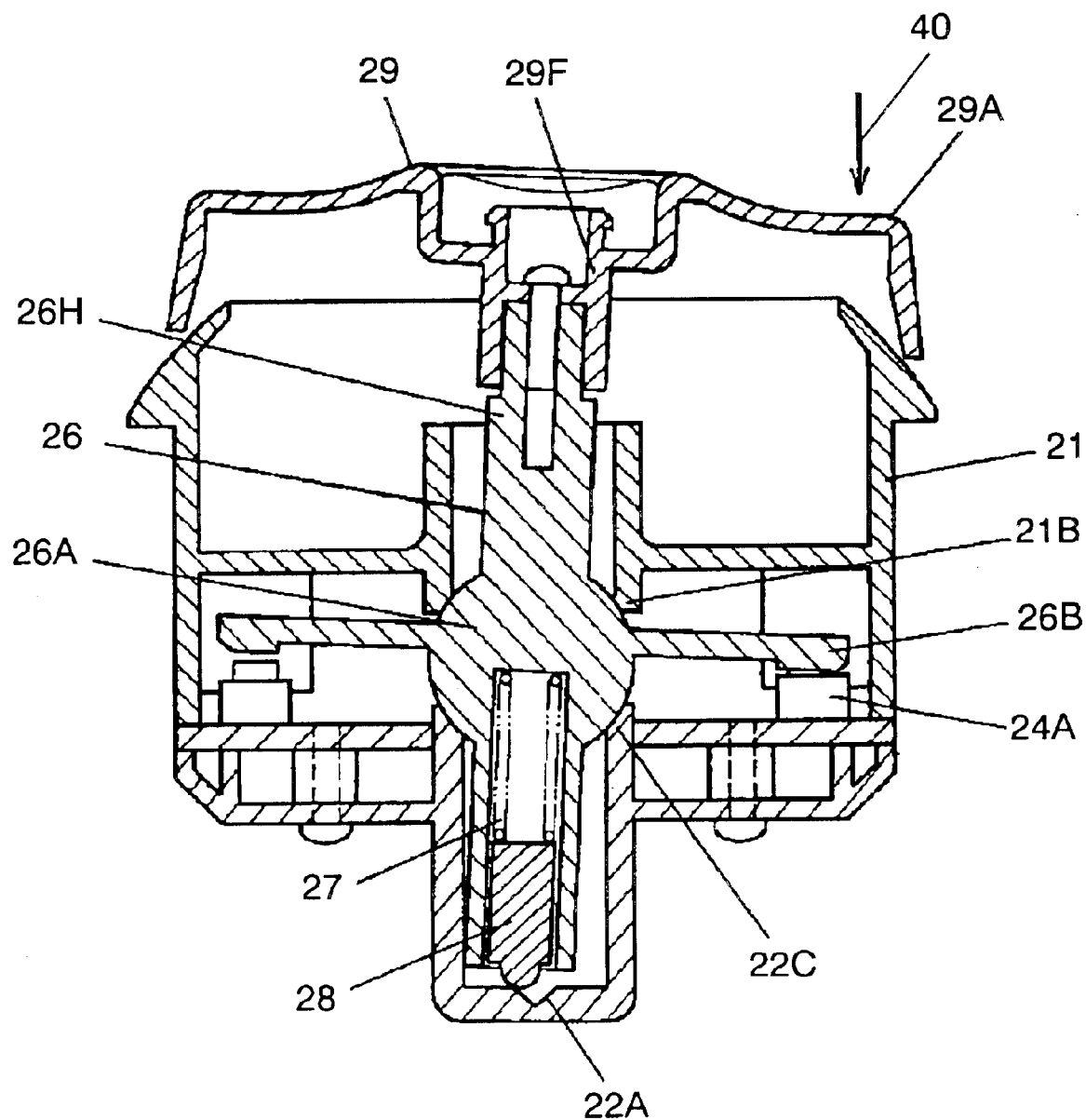
FIG. 3 is a sectional side elevation of the multidirectional operation switch in accordance with the exemplary embodiment of the present invention, when an operating body thereof is depressed.

In the above structure, operating body 29 is depressed in a given direction. For example, operating part 29A at the right end is depressed downwardly. At this time, as shown in the sectional side elevation of FIG. 3, rocking body 26 rocks in a rightward direction on a fulcrum at fulcrum portion 26A. With reference to FIG. 3, operating body 29 is depressed in the direction shown by arrow 40.

Operating shaft 26H of rocking body 26 is fixed and connected to mounting part 29F of operating body 29. Fulcrum portion 26A is held by upper support 21B of upper case 21 and lower support 22C of lower case 22. At this time, the tip of depressing part 26B depresses push button switch 24A and thereby electrical contact of push button switch 24A is established or broken. A signal corresponding to this electrical contact is transferred to the electronic circuits of an automobile outside of this multidirectional operation switch via leads 23B connected to circuit board 23.

When operating operating-body 29, a user obtains a feel of operation with a click touch. The reason is that the following actions are performed.

Before operation, operating body 29 is in a neutral position thereof. In this position, as shown in the sectional view of an essential part of FIG. 4A, tip part 28A of tactile feedback pin 28 is in resilient contact with first inclined planes 22E of recess 22A. At this time, tactile feedback pin 28 is urged in the direction shown by arrow 42 by coil spring 27.

Figure 4A:
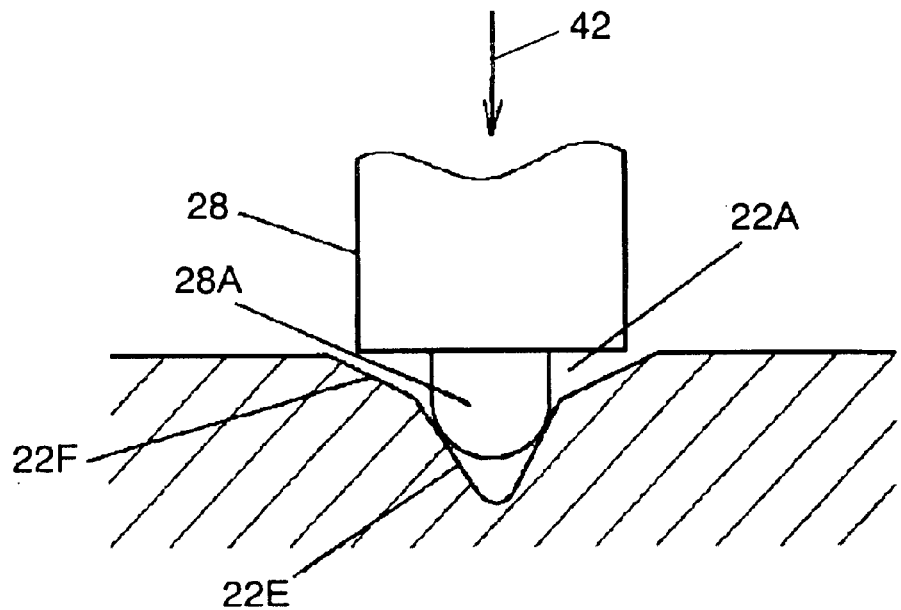
FIGS. 4A and 4B are sectional views of essential parts of the multidirectional operation switch in accordance with the exemplary embodiment of the present invention.
Figure 4B:
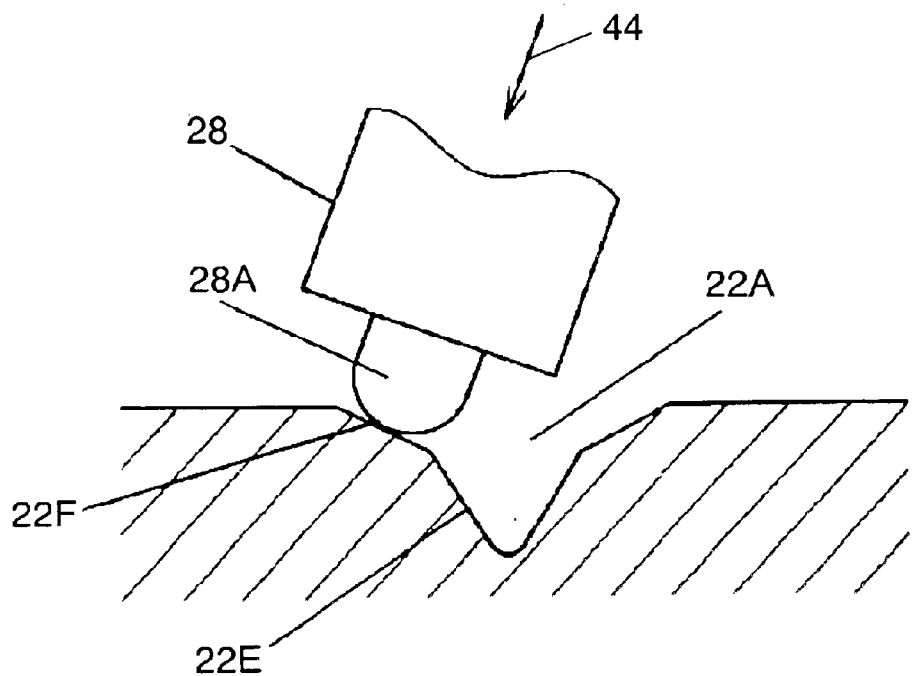
Figure 5:
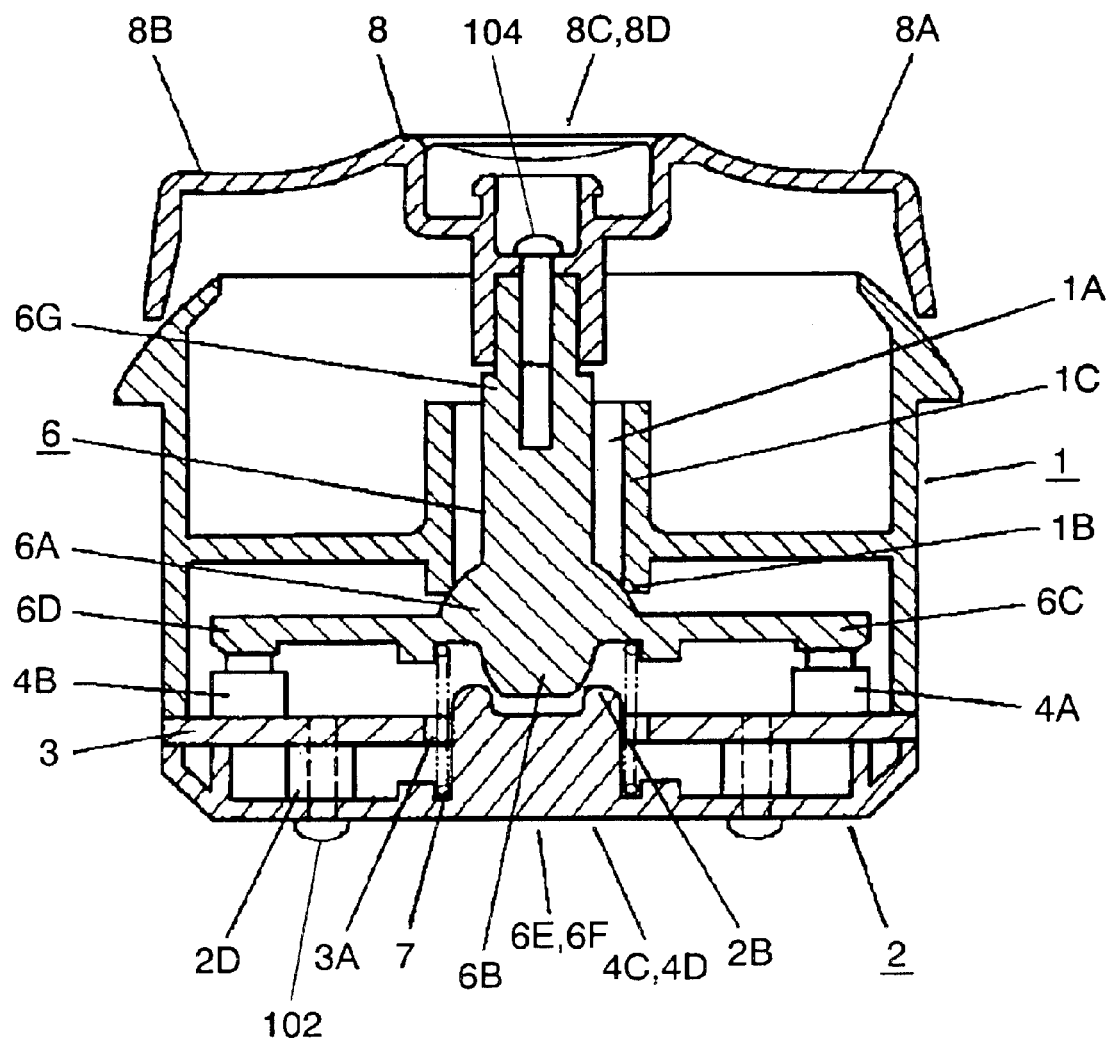
FIG. 5 is a sectional side elevation of a conventional multidirectional operation switch.

As operating body 29 and rocking body 26 are rocked in this state, tip part 28A moves from first inclined plane 22E to second inclined plane 22F having more gradual inclination, in resilient contact therewith, as shown in FIG. 4B. This instantaneously reduces the load required to operate operating-body 29. Thus, operating operating-body 29, a user obtains a click touch. At this time, tactile feedback pin 28 is urged in the direction shown by arrow 44 by coil spring 27.

When electrical contact of push button switch 24A is established or broken and then depressing operation of operating body 29A is stopped, the following actions are performed.

Tip part 28A of tactile feedback pin 28 returns from a state in which tip part 28A is in resilient contact with second inclined plane 22F to the neutral position in which tip part 28A is sandwiched between first inclined planes 22E. This action occurs because coil spring 27 urges tactile feedback pin 28 to push it against the inclined planes. At this time, rocking body 26 is urged in a leftward direction and operating body 29 also returns to the neutral position as shown in FIG. 1.

Similarly, when operating body 29 is depressed in the other directions, i.e. when any one of operating parts 29B through 29E is depressed downwardly, a feel of operation with a click touch can be obtained. In this case, the tip of one of depressing parts 26C through 26F of rocking body 26 corresponding to operating parts 29B through 29E depresses a corresponding one of push switch buttons 24B through 24E and establishes or breaks electrical contact of the corresponding one of push button switches 24B through 24E.

The multidirectional operation switch of this embodiment further has the following structure.

Spherical fulcrum portion 26A, i.e. the center of rocking, is provided in the middle of rocking body 26. This fulcrum portion 26A is held by upper support 21B of the upper case and lower support 22C of the lower case that have spherical curved surfaces having the same center as the fulcrum portion. Further, rocking body 26 houses slightly elongated coil spring 27 and tactile feedback pin 28 in the lower part of fulcrum portion 26A. Tactile feedback pin 28 is in resilient contact with recess 22A provided in the bottom of lower case 22.

In this multidirectional operation switch, when a user depresses operating body 29, fulcrum portion 26A of rocking body 26 is supported by upper support 21B and lower support 22C. At this time, fulcrum portion 26A is supported by upper support 21B and lower support 22C so that constant small clearances are kept therebetween within the operating range of rocking body 26. This structure can reduce jerky movement of rocking body 26. Further, recess 22A in the lower case and tactile feedback pin 28 in resilient contact with the recess ensures the load that generates tactile feedback. This is because tactile feedback pin 28 is brought into resilient contact with recess 22A by coil spring 27. This structure can provide a multidirectional operation switch that provides a positive feel of operation and has excellent operability.

Further, the side face of recess 22A in resilient contact with tactile feedback pin 28 is formed of inclined planes having different angles of inclination. For example, first inclined plane 22E having a steeper inclination is provided from the center of recess 22A. Second inclined plane 22F having an inclination more gradual than that of first inclined plane 22E is continuously provided. When rocking body 26 is rocked from the neutral position thereof, tactile feedback pin 28 moves in resilient contact with first inclined plane 22E having the steeper inclination on the center side of recess 22A and then moves in resilient contact with second inclined plane 22G having the inclination more gradual than that of first inclined plane 22E. Thus, when tactile feedback pin 28 moves from first inclined plane 22E to second inclined plane 22F, the load required to operate operating-body 29 is instantaneously reduced. This provides a user with a positive feel of operation with a click touch. Appropriate selection of angles of the first and second inclined planes can realize multidirectional operation switches having different feels of operation.

In the above description, coil spring 27 is used as a resilient member, and tactile feedback pin 28 is used as a tactile feedback member. Alternatively, a flat spring made of a metal plate can be used as a resilient member. A metal sphere can be used as a tactile feedback member.

Shown in FIG. 4 is an example in which semi-spherical tip part 28A of tactile feedback pin 28 projects from tactile feedback pin 28. However, the tip part of tactile feedback pin 28 can be formed like a semi-sphere or a cone approximating to a circular cone that smoothly lead to the rod part of tactile feedback pin 28 shown in FIG. 4.

As described above, the present invention can provide a multidirectional operation switch of a simple structure that causes less jerky movement and provides a positive feel of operation during operation, and has excellent operability.

What is claimed is:

1. A multidirectional operation switch comprising:
   (a) a substantially cylindrical upper case;
   (b) a lower case covering a bottom surface of said upper case;

(c) a rocking body held between said upper case and said lower case to be capable of rocking, said rocking body having a plurality of depressing parts radially projecting from a center thereof, and an operating shaft projecting upwardly therefrom;

(d) a plurality of switches each of which is to be depressed by a respective one of the plurality of depressing parts according to rocking of said rocking body to establish or break electrical contact;

(e) a resilient member housed in a lower portion of said rocking body; and (f) a tactile feedback member housed in a position below said resilient member in the lower portion of said rocking body;

wherein said tactile feedback member is urged by said resilient member and brought into resilient contact with a recess provided in said lower case;

wherein said rocking body has a spherical fulcrum portion, that is a center of rocking, in a middle thereof leading to the operating shaft;

wherein said upper case has an upper support having a first spherical curved surface;

wherein said lower case has a lower support having a second spherical curved surface;

wherein the fulcrum portion is held by the first spherical curved surface and the second spherical curved surface; and wherein centers of the spherical fulcrum portion, the first spherical curved surface, and the second spherical curved surface are in substantially the same position.

2. The multidirectional operation switch of claim 1, wherein said tactile feedback member has a projecting tip part in resilient contact with the recess.

3. The multidirectional operation switch of claim 2, wherein a side aid lower case is formed of a plurality of inclined planes having different inclinations.

4. The multidirectional operation switch of claim 1, wherein a side aid lower case is formed of a plurality of inclined planes having different inclinations.

* * * * *

UNITED STATES PATENT AND TRADEMARK OFFICE
CERTIFICATE OF CORRECTION

PATENT NO. : 6,852,938 B2
APPLICATION NO. : 10/701604
DATED : February 8, 2005
INVENTOR(S) : Yoshiyuki Nakade It is certified that error appears in the above-identified patent and that said Letters Patent is hereby corrected as shown below:

In column 8, claim 3, line 2, "side aid" should read --side face of the recess provided in said--.

In column 8, claim 4, line 2, "side aid" should read --side face of the recess provided in said--.

Signed and Sealed this

Sixth Day of February, 2007

JON W. DUDAS
*Director of the United States Patent and Trademark Office*